INVENTORS
WALLACE J.S. JOHNSON
ROBERT E. FISHER
BY
Mellin and Hanscom
ATTORNEYS

Nov. 22, 1955 W. J. S. JOHNSON ET AL 2,724,620
POWER TOWER
Filed April 12, 1954 6 Sheets-Sheet 2

INVENTORS
WALLACE J.S. JOHNSON
ROBERT E. FISHER
BY
Mellin and Hanscom
ATTORNEYS

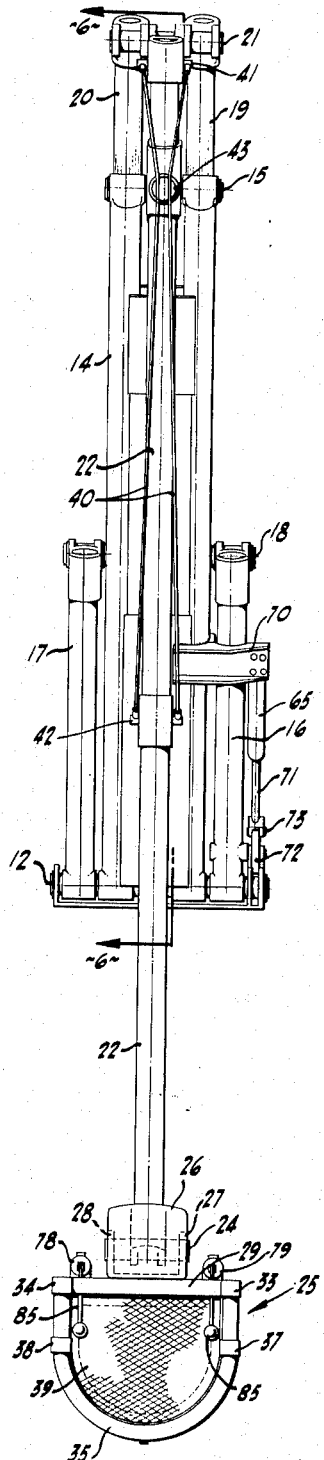
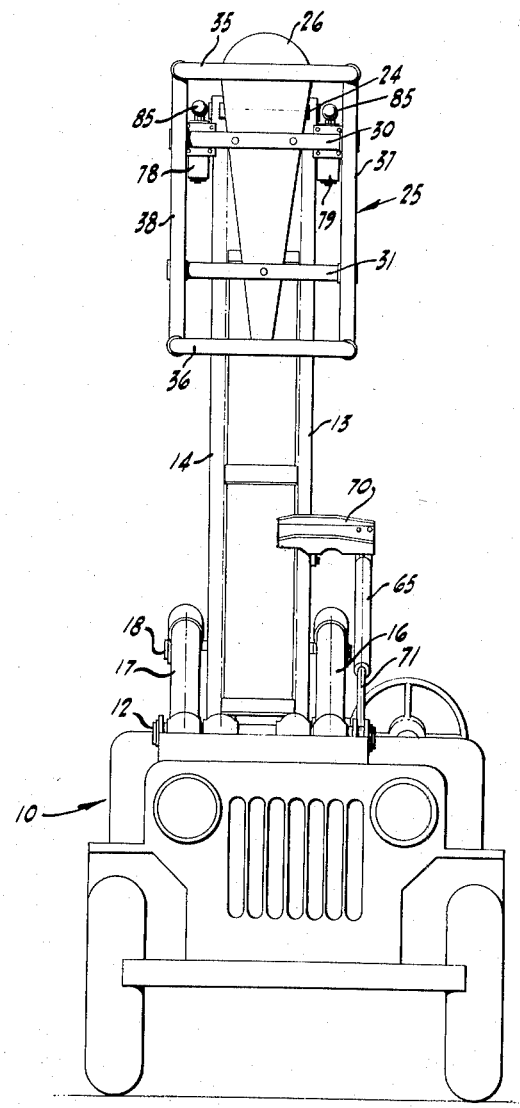
FIG.3
FIG.4
INVENTORS
WALLACE J.S. JOHNSON
ROBERT E. FISHER
BY
Mellin and Hanson
ATTORNEYS

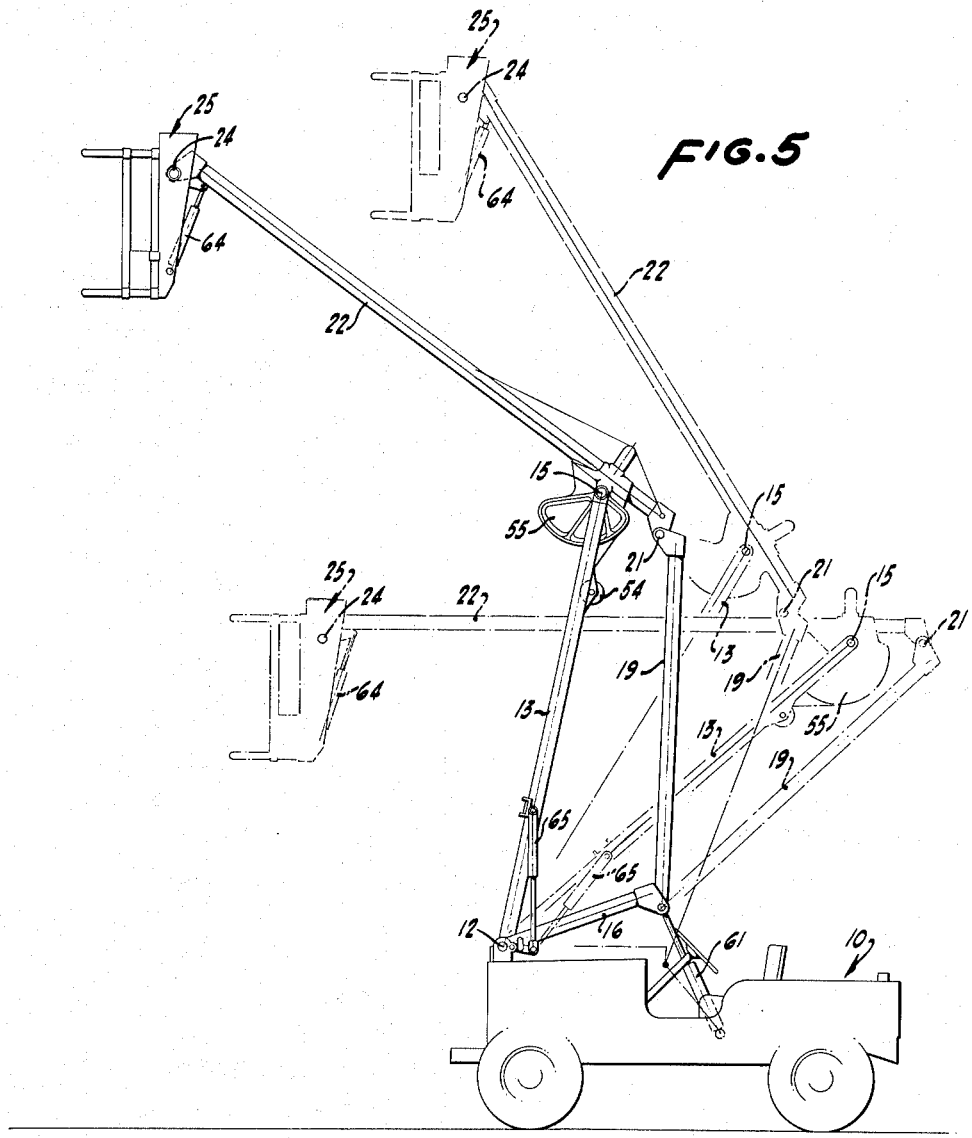

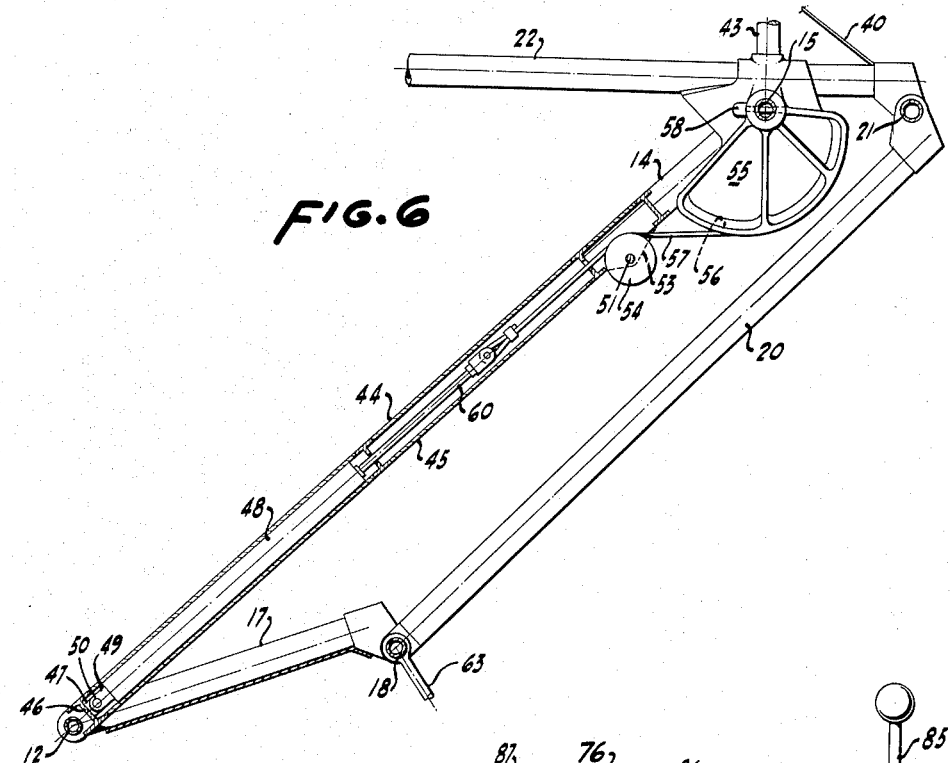

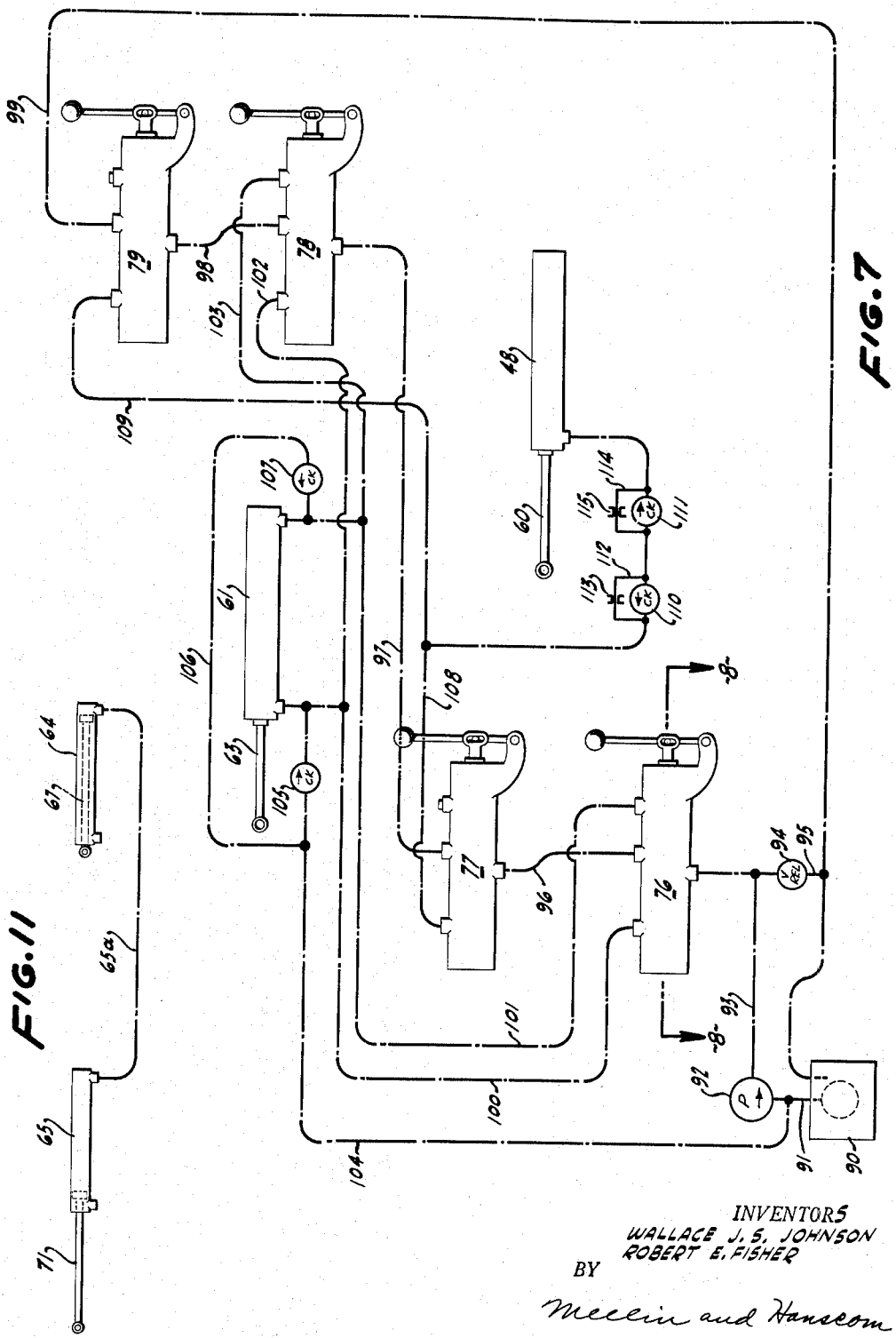

United States Patent Office 2,724,620
Patented Nov. 22, 1955

2,724,620

POWER TOWER

Wallace J. S. Johnson and Robert E. Fisher, Berkeley, Calif., assignors to Up-Right, Inc., Berkeley, Calif., a corporation of California Application April 12, 1954, Serial No. 422,332

17 Claims. (Cl. 304—29)

The present invention relates to a power tower for use by workmen employed as painters, electrical fixture repairmen, aircraft maintenance men, window washers, and a multitude of similar occupations wherein it is necessary to perform a task at some distance above the ground and thus ordinarily require the use of ladders or scaffolding of some type. More particularly, the invention relates to a workman's platform supported by a collapsible tower structure which in turn is mounted on a wheeled vehicle.

Prior to this invention, when performing the various tasks outlined above, it was either necessary to employ ladders wherein much time was lost since the workmen were frequently required to descend and shift the ladder to a new position, or to employ scaffolds, wherein much time was lost in placing the necessary scaffolding next to the structure to be worked on prior to starting the actual work.

It is the principal object of this invention to reduce this lost time by providing a work platform mounted on a vehicle which may be moved or driven into close proximity with the structure on which the work is to be performed, and wherein the work platform may be raised or lowered with respect to said vehicle, and may be tilted forwardly away from said vehicle toward said structure, all of said movements being controllable either from the work platform or from the vehicle.

Various other objects of the instant invention will be apparent from reading the following detailed specification in conjunction with the accompanying drawings, in which:

Fig. 3 is a plan view of the structure as shown in Fig. 2.

Fig. 4 is a front elevation of the structure as shown in Fig. 2.

Fig. 5 is a schematic view of the structure, similar to Fig. 2, showing the platform in three different positions.

Fig. 6 is a sectional view taken on line 6—6 of Fig. 3.

Fig. 7 is a schematic view of the hydraulic system for raising, lowering and tilting the tower.

Fig. 8 is a sectional view of one of the control valves taken on line 8—8 of Fig. 7, and showing the valve in its center or normal position.

Figs. 9 and 10 are views similar to Fig. 8, showing the valve in its two end positions.

Fig. 11 is a schematic view of the hydraulic system used to maintain the platform level as the tower structure is raised or lowered.

Figure 1:
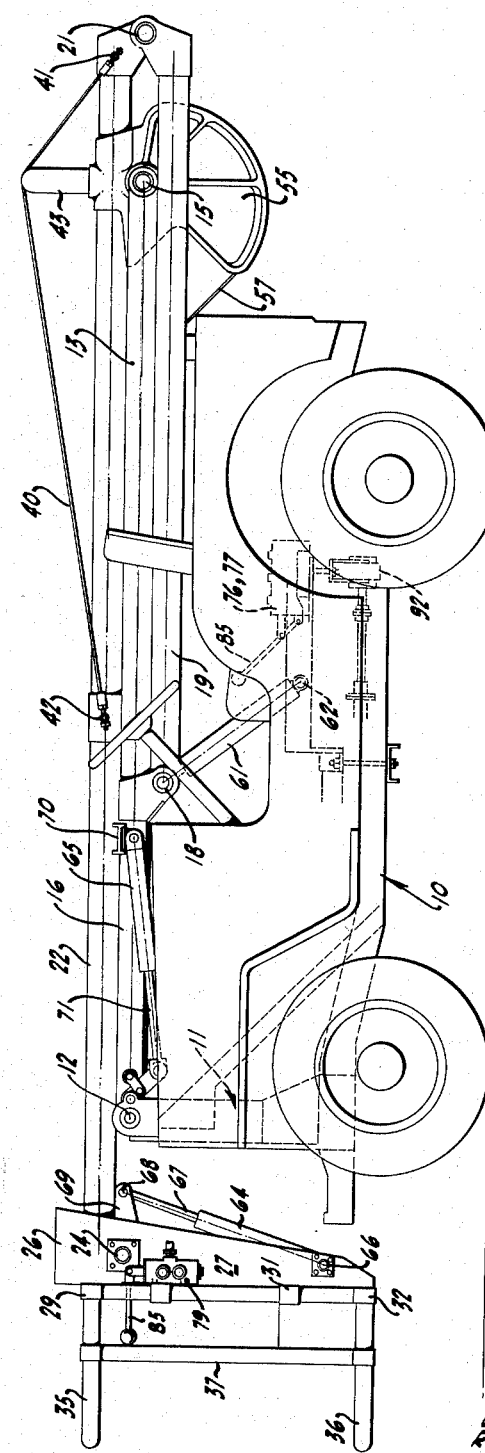
Fig. 1 is a side elevation of a structure, embodying the principles of our invention, and wherein the tower is shown in collapsed relation.

Referring now to the drawings, wherein similar reference numerals are used to designate similar elements throughout the various views shown, 10 generally indicates the vehicle on which the tower is mounted. The vehicle used to support the tower may be of the automotive type and may assume various forms. In the specific embodiment described herein the vehicle is of the type commonly designated as a "jeep." A supporting framework, generally indicated at 11, is bolted or otherwise fastened to the vehicle frame, and supports a transverse shaft 12 adjacent the front of the vehicle.

Figure 2:
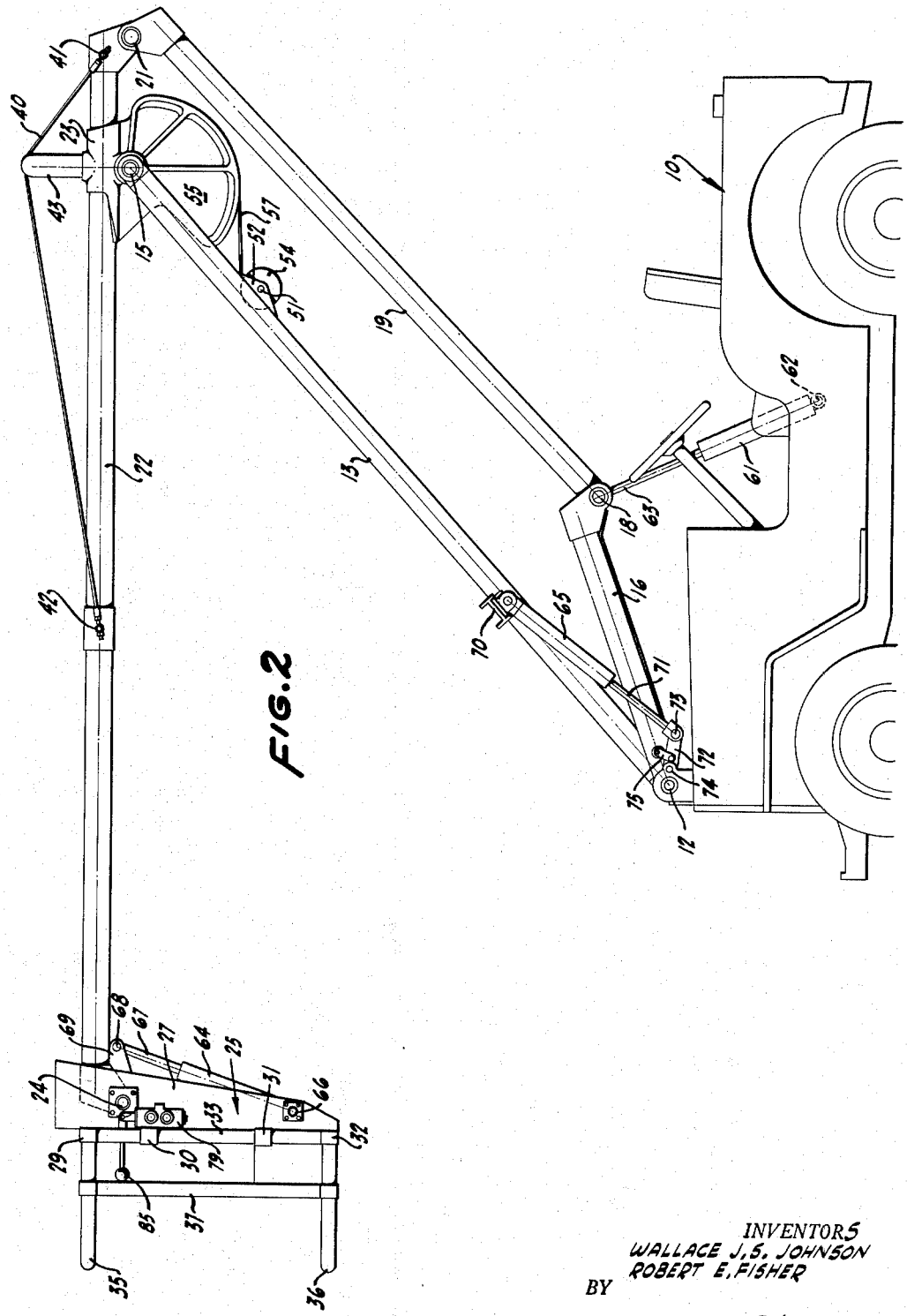
Fig. 2 is a view similar to that shown in Fig. 1, but showing the tower in a partially raised position and tilted forwardly to extend the work platform forward from the vehicle.

Referring now particularly to Figs. 2, 3 and 4, two parallel derrick arms 13 and 14 are pivotally mounted on shaft 12. Arms 13 and 14 are connected together by, and support at their outer ends, a transverse pivot shaft 15. A pair of tilt arms 16 and 17 are mounted on shaft 12, outside of arms 13 and 14, and are similarly connected together at their outer ends by a transverse pivot shaft 18. A pair of stabilizer arms 19 and 20 are pivotally mounted on the shaft 18 and are connected together at their outer ends by a transverse pivot shaft 21. The stabilizer arms 19 and 20 are in the same vertical planes as derrick arms 13 and 14 respectively. A boom 22 is pivotally attached at one of its ends to the shaft 21. A saddle structure 23 is mounted on said boom 22 adjacent to but spaced from said one end. Said saddle structure is pivotally fastened to the shaft 15 at the outer ends of the derrick arms 13 and 14, thus completing a quadrilateral structure comprising the derrick arms 13 and 14, the tilt arms 16 and 17, the stabilizer arms 19 and 20, and the portion of the boom 22 between the saddle structure 23 and the end of the boom adjacent thereto. It may be seen that rotation of the boom 22 relative to the derrick arms 13 and 14 about the pivot shaft 15 will cause said structure to expand from the collapsed relation illustrated in Fig. 1 to an expanded relation such as illustrated in Figs. 2 and 5.

A horizontal pivot shaft 24 is fixedly mounted to the outer end of the boom 22 and supports a work platform generally indicated at 25 pivotally attached thereto. The platform 25 comprises a generally U-shaped vertically extending mounting bracket 26 having rearwardly extending flanges 27 and 28. The flanges 27 and 28 are pivotally mounted on the shaft 24. Four cross braces 29, 30, 31 and 32 of equal length are bolted to the front face of the bracket 26. Two vertical tubular members 33 and 34 are respectively fastened to the opposite ends of the cross braces 29 through 32. A semicircular member 35 extends horizontally forward from, and is fixed to, the upper ends of the vertical members 33 and 34. Similarly, a semicircular member 36 extends horizontally forward from, and is fixed to, the lower ends of vertical members 33 and 34. Two vertical bracing members 37 and 38 are each fastened between the semicircular members 35 and 36 adjacent each end thereof. A floor 39 is fastened to and supported by the lower semicircular member 36.

As best seen in Fig. 2, the boom 22 is strengthened and stiffened by a pair of guy wires 40 each fastened at one of its ends 41 near the rear end of the boom 22 and at its other end 42 to a point approximately midway of the boom 22. The guy wires 40 are trained over the upper end of a vertical member 43 supported on the saddle 23.

As can best be seen in Fig. 6, upper and lower plates 44 and 45 are fastened between the arms 13 and 14 adjacent the top and bottom thereof and form a box-like enclosure between said arms. The lower end of said box, adjacent the pivot shaft 12, is closed by a transverse I beam 46 fastened between said arms 13 and 14 and between said plates 44 and 45. A bracket 47 is rigidly fastened to said I beam 46 and extends outwardly at right angles thereto toward the open end of said box-like structure. A hydraulic lift cylinder 48 is mounted in said box-like structure and extends generally parallel to the derrick arms 13 and 14. A bracket 49 is fastened to the rear end of said cylinder 48 and in turn is fastened to the bracket 47 by a clevis pin 50. A pulley shaft 51 is mounted on the brackets 52 and 53 fastened to the lower portion of arms 13 and 14, respectively, beyond the ends of the plates 44 and 45. A pulley sheave 54 is mounted on said shaft 51 between the derrick arms 13 and 14.

A cam-shaped element 55 having a cable groove 56 formed in its outer cam surface is formed integral with and extends downwardly from the saddle structure 23. A cable 57 is fastened at one of its ends 58 to the saddle structure 23 and extends around said cam element 55 in the groove 56 and over the pulley sheave 54. The other end of the cable 57 is fastened at 59 to the end of a piston rod 60 extending outwardly from the lift cylinder 48. From this construction it may be seen that when the piston rod 60 is drawn into the lift cylinder 48, the boom 22 is rotated clockwise about the pivot shaft 15, thus opening the quadrilateral structure previously described and raising the platform 25.

The mechanism for tilting the structure relative to the vehicle to extend the platform 25 is best illustrated in Fig. 2 and comprises a tilt cylinder 61 pivotally attached to the vehicle as at 62, and a piston rod 63 slidable in said cylinder 62 and pivotally attached to the pivot shaft 18 which connects the outer ends of the tilt arms 16 and 17.

The mechanism for maintaining the platform level comprises two hydraulic cylinders 64 and 65 which, as best seen in Fig. 11 are linked together by a closed hydraulic line 65a connecting the back ends of the cylinders together. Referring now again to Fig. 2, the upper leveling cylinder 64 is pivotally mounted at one of its ends to a transverse shaft 66 which in turn is mounted between the flanges 27 and 28 of the platform mounting bracket 26. A piston rod 67 extends out of the other end of the cylinder 64 and is pivotally attached by a pin 68 to a bracket 69 which is mounted on the platform mounting shaft 24 and extends rearwardly therefrom and bears against the lower surface of the boom 22.

The lower leveling cylinder 65 is pivotally attached at one of its ends to a bracket 70 which, as best seen in Figs. 3 and 4, is welded to the derrick arm 13. A piston rod 71 extends from the other end of the cylinder 65 and is pivotally attached to one end of a tilt compensating lever 72 by a pin 73. The other end of the tilt compensating lever 72 is pivotally mounted on a pin 74 mounted on the vehicle parallel to, but spaced rearwardly from, the primary structure pivot shaft 12. A link 75 connects the lever 72 intermediate its ends to the tilt arm 16.

From the structure recited immediately above, it may be seen by an examination of Fig. 2 that as the platform is raised the derrick arm 13 rotates counterclockwise relative to the tilt arm 16 and causes the connection 65, 71 to elongate. Through the closed hydraulic circuit, previously described and illustrated schematically in Fig. 9, the cylinder piston connection 64, 67 is shortened and rotates the platform 25 counterclockwise relative to the boom 22 to maintain the platform horizontal as the supporting structure is extended or collapsed. Still referring to Fig. 2, it may be seen that if the tilt cylinder is actuated to rotate the tilt arm 16 clockwise, the derrick arm 13 will rotate therewith. However, due to the spacing between the pivot pin 74 and pivot shaft 12, the lever 72 will rotate a greater amount than the arm 13 and thus elongate the lower cylinder and piston connection 65, 71, thus shortening the upper cylinder and piston connection 64, 67 to maintain the platform 25 level as the supporting structure tilts.

As best seen in the schematic diagram shown in Fig. 7, two hydraulic distributing valves 76 and 77 are located on the vehicle for controlling the tilt and lift cylinders 61 and 48, respectively. Similarly, two hydraulic distributing valves 78 and 79 are located on the platform for controlling the tilt and lift cylinders 61 and 48, respectively. All of the valves are of the three position center open type and are best understood in conjunction with Figs. 8 to 10, inclusive, wherein the valve 76 is shown in detail. The valve 76 comprises a cylindrical housing 80 closed at its end by caps 81 and 82. An operating rod 83 extends through the cap 81 and is connected to a piston type valve 84 slidably received within the housing 80. The other end of the rod 83 is connected to a manual operating handle 85 whereby the valve piston 84 may be shifted from its center position shown in Fig. 8 to either of its end positions illustrated in Figs. 9 and 10. (The valve piston 84 is normally biased by means not shown toward its center position.)

The housing 80 is provided with an inlet port 85, a central outlet port 86 and two end outlet ports 87 and 88. The valve piston 84 is provided with a plurality of annular valve grooves 89 adapted to register with the various ports in the housing and interconnected in such manner that when the valve is in the position shown in Fig. 8, inlet port 85 is in communication with center port 86, and end ports 87 and 88 are closed. When in the position shown in Fig. 9, inlet port 85 is in communication with end port 87, and end port 88 is in communication with center port 86. When in the position shown in Fig. 10, inlet port 85 is in communication with end port 88, and end port 87 is in communication with center port 86.

Referring again to Fig. 7 a fluid reservoir 90 is located on the vehicle and contains the hydraulic fluid for actuating the hydraulic system. A suction conduit 91 connects the hydraulic reservoir 90 with the inlet side of a high pressure pump 92. A conduit 93 connects the high pressure side of pump 92 with the inlet port 85 of the valve 76. A regulating valve 94 and a bypass conduit 95 are connected between the conduit 93 and the reservoir 90 to regulate the pressure of the fluid entering the port 85 of the valve 76. The center outlet 86 of the valve 76 is connected with the inlet port of the valve 77 by a conduit 96. Similarly, the center outlet of the valve 77 is connected to the inlet of the valve 78, and the center outlet of the valve 78 is connected to the inlet of the valve 79 by conduits 97 and 98, respectively. A return conduit 99 connects the center outlet of the valve 79 with the reservoir 90. From these connections, it is evident that when all of the valves are in their center or normal position, the fluid from pump 92 merely circulates through all of the valves in series and returns through the conduit 99 to the reservoir 90.

A conduit 100 connects one end outlet of the valve 76 with one end of the tilt cylinder 61, and a conduit 101 connects the other end outlet of the valve 76 with the other end of the tilt cylinder 61. Similarly, a conduit 102 connects one end outlet of the valve 78 to the conduit 100, and a second conduit 103 connects the other end outlet of the valve 78 with the conduit 101, whereby the tilt cylinder can be actuated by either valve 76 or valve 78.

It was found in practice that under certain conditions a vacuum was created in the conduits 100 or 101 and when either of these lines were under vacuum, operation of the tilt cylinder was jerky and resulted in sudden dropping of the tower from its tilted position toward its rest position. To prevent the formation of a vacuum in the conduits 100 or 101, a conduit 104 connects the fluid reservoir with the conduit 100 adjacent the tilt cylinder 61. A check valve 105 prevents high pressure fluid from the conduit 100 from escaping through the conduit 104. A branch conduit 106 connects the conduit 104, between the reservoir and the check valve 105, to the conduit 101 adjacent the tilt cylinder 61. A check valve 107 prevents the high pressure fluid from the conduit 101 from entering the conduit 106.

A conduit 108 connects one end outlet of the valve 77 with one end of the lift cylinder 48, and a conduit 109 connects one end outlet of the valve 79 with the conduit 108. The opposite end outlet of each of the valves 77 and 79 is closed with a suitable plug. A pair of oppositely directed check valves 110 and 111 are interposed in the conduit 108 between its connection with the conduit 109 and the lift cylinder 48. A bypass passageway 112 bypasses the check valve 110 and contains a metering valve 113. Similarly, a bypass passage 114 bypasses the check valve 111 and contains a metering valve 115, whereby when fluid is passing from the valve 77 or the valve 79 to the cylinder 48, it will pass through the check valve 110 without restriction and through the metering valve 115, and, conversely, when fluid is passing from the cylinder 48 to the valve 77 or the valve 79, the fluid will pass through the check valve 111 without restriction and through the metering valve 113. With this arrangement, it is possible to independently control the rate of ascent or descent of the platform 25.

From the above description, it may be seen that I have provided a structure which may be quickly brought to the desired location and actuated to bring the operator's platform closely adjacent to the areas on which he desires to work, and further that the position of the platform may be shifted by the operator without descending from the platform. By using the disclosed invention, the time necessary to erect scaffolding has been eliminated and, if ladders are used, the time necessary for a workman to descend from the ladder and shift it to a new location and then reascend the ladder has been eliminated.

While I have shown a preferred form of my invention, it is to be understood that various changes may be made in its construction by those skilled in the art without departing from the spirit of the invention as defined in the appended claims.

Having thus described our invention, what we claim and desire to secure by Letters Patent is:

1. A device of the class described comprising a wheeled vehicle, a first arm pivotally attached at one of its ends to the vehicle, a second arm shorter than said first arm and pivotally attached to said vehicle at one of its ends to pivot about the same axis as said first arm, extensible means connecting the outer end of said second arm to said vehicle, a third arm pivotally attached at one of its ends to the other end of said second arm, a boom member pivotally attached at a point adjacent to but spaced from one of its ends to the other end of said first arm and pivotally attached at said one of its ends to the other end of said third arm, a platform connected to the other end of said boom, means adapted to rotate said boom about its pivotal connection to said first arm to raise said platform relative to said vehicle.

2. A device as set forth in claim 1 wherein the extensible connection between the outer end of said second arm and said vehicle comprises a hydraulic cylinder and piston whereby said structure may be tilted relative to said vehicle to extend said platform away from said vehicle to reach over obstacles present at ground level.

3. A device as set forth in claim 2 wherein the means for rotating the boom comprises a saddle fixed to the boom and having curved cam surface projecting below the boom at the point where the boom is pivoted to said first arm, a sheave mounted on said first arm, a cable fixed at one of its ends to the saddle and wrapped around said cam surface and trained over said sheave, a hydraulic cylinder mounted on said first arm, and a piston in said cylinder attached to the other end of said cable.

4. A device as set forth in claim 3 wherein said platform is pivotally attached to said boom, and means for maintaining said platform substantially level as it is raised and lowered.

5. A device as set forth in claim 4 wherein said last-mentioned means comprises a hydraulic cylinder fastened to said first arm, a piston slidable in said cylinder and connected to one end of a first link, the other end of a first link being pivotally attached to said vehicle, a second link connected at one of its ends to said first link intermediate its ends, the other end of said second link being connected to said second arm, a second hydraulic cylinder fastened to said boom, a second piston slidable in said second cylinder and fastened to said platform, and a hydraulic conduit connecting the rear ends of the two cylinders.

6. A device of the class described comprising a wheeled vehicle, a first pair of arms pivotally attached at one of their ends to the vehicle, a second pair of arms shorter than said first pair of arms and pivotally attached to said vehicle at one of their ends to pivot about the same axis as said first pair of arms, extensible means connecting the outer end of said second pair of arms to said vehicle, a third pair of arms pivotally attached at one of their ends to the other ends of said second pair of arms, a boom member pivotally attached at one of its ends between the other ends of said third pair of arms and pivotally attached intermediate its ends between the other ends of said first pair of arms, a platform connected to the other end of said boom, and means adapted to rotate said boom about its pivotal connection to said first pair of arms to raise said platform relative to said vehicle.

7. A device as set forth in claim 6 wherein the connection between said other ends of said second pair of arms and said vehicle comprises a hydraulic cylinder and piston, whereby said structure may be tilted relative to said vehicle to extend said platform away from said vehicle to reach over obstacles present at ground level.

8. A device as set forth in claim 7 wherein the means for rotating the boom comprises a curved cam surface projecting below the boom at the point where the boom is pivoted between said first pair of arms, a sheave mounted between said first pair of arms intermediate the ends thereof, a cable fixed at one of its ends to the boom and wrapped around said cam surface and trained over said sheave, a hydraulic cylinder mounted between said first arms, and a piston in said cylinder attached to the other end of said cable.

9. A device as set forth in claim 8 wherein said platform is pivotally attached to said boom, and means for maintaining said platform substantially level as it is raised and lowered.

10. A device as set forth in claim 9 wherein said last mentioned means comprises a hydraulic cylinder fastened to said first pair of arms, a piston slidable in said cylinder and fastened to said second pair of arms, a second hydraulic cylinder fastened to said boom, a second piston slidable in said second cylinder and fastened to said platform, and a hydraulic conduit connecting the rear ends of the two cylinders.

11. A device of the class described comprising a wheeled vehicle, a first pair of arms pivotally attached at one of their ends to the vehicle, a second pair of arms shorter than said first pair of arms and pivotally attached to said vehicle at one of their ends to pivot about the same axis as said first pair of arms, extensible means connecting the outer ends of said second pair of arms to said vehicle, a third pair of arms pivotally attached at one of their ends to the other ends of said second pair of arms, a boom member pivotally attached at one of its ends between the other ends of said third pair of arms and pivotally attached intermediate its ends between the other ends of said first pair of arms, a platform connected to the other end of said boom, and hydraulic means adapted to rotate said boom about its pivotal connection to said first pair of arms to raise said platform relative to said vehicle.

12. A device as set forth in claim 11 wherein the connection between the outer ends of said second pair of arms and said vehicle comprises a hydraulic cylinder and piston, whereby said structure may be tilted relative to said vehicle to extend said platform away from said vehicle to reach over obstacles present at ground level.

13. A device as set forth in claim 12 wherein the means for rotating the boom comprises a curved cam surface projecting below the boom at the point where the boom is pivoted between said first pair of arms, a sheave mounted on said first pair of arms intermediate the ends thereof, a cable fixed at one of its ends to the boom and wrapped around said cam surface and trained over said sheave, a hydraulic cylinder mounted between said first pair of arms, and a piston in said cylinder attached to the other end of said cable.

14. A device as set forth in claim 13 wherein said platform is pivotally attached to said boom, and means for maintaining said platform substantially level as it is raised and lowered.

15. A device as set forth in claim 11 wherein said last-mentioned means comprises a hydraulic cylinder fastened to said first pair of arms, a piston slidable in said cylinder and fastened to said second pair of arms, a second hydraulic cylinder fastened to said boom, a second piston slidable in said second cylinder and fastened to said platform, and a hydraulic conduit connecting the rear ends of the two cylinders.

16. In a device of the character described, a control system comprising a hydraulic lift cylinder; a hydraulic tilt cylinder; a hydraulic fluid reservoir; a pump with its suction side connected to said reservoir; a first lift control valve; a first tilt control valve; a second lift control valve; a second tilt control valve; each of said valves having two extreme positions and a center position and being so constructed that when in said center position the inlet is connected to the center outlet and the two end outlets are closed, when in one extreme position the inlet is connected with one end outlet and the other end outlet is connected with said center outlet, and when in said other extreme position said inlet is connected with said other end outlet and said one end outlet is connected with said center outlet; each of said valves being biased toward its center position; conduit means connecting the inlet of said first tilt valve to the high pressure side of said pump; conduit means connecting the center outlet of said first tilt valve with the inlet of said first lift valve; conduit means connecting the center outlet of said first lift valve with the inlet of said second tilt valve; conduit means connecting the center outlet of said second tilt valve with the inlet of said second lift valve; conduit means connecting the center outlet of said second lift valve with said fluid reservoir; conduit means connecting one end outlet of each of said lift valves with one end of said lift cylinder; plugs in the other end outlet of each of said lift valves; conduit means connecting one end outlet of each of said tilt valves with one end of said tilt cylinder; conduit means connecting the other end outlet of each of said tilt valves with the other end of said tilt cylinder.

17. In a device such as described in claim 15, a control system comprising a hydraulic fluid reservoir on said vehicle; a pump on said vehicle with its suction side connected to said reservoir; a first lift control valve mounted on said vehicle; a first tilt control valve on said vehicle; a second lift control valve on said platform; a second tilt control valve on said platform; each of said valves having two extreme positions and a center position and so constructed that when in said center position the inlet is connected to the center outlet and the two end outlets are closed, when in one extreme position the inlet is connected with one end outlet and the other end outlet is connected with said center outlet, and when in said other extreme position said inlet is connected with said other end outlet and said one end outlet is connected with said center outlet; each of said valves being biased toward its center position; conduit means connecting the inlet of said first tilt valve to the high pressure side of said pump; conduit means connecting the center outlet of said first tilt valve with the inlet of said first lift valve; conduit means connecting the center outlet of said first lift valve with the inlet of said second tilt valve; conduit means connecting the center outlet of said second tilt valve with the inlet of said second lift valve; conduit means connecting the center outlet of said second lift valve with said fluid reservoir; conduit means connecting one end outlet of each of said lift valves with one end of said lift cylinder; plugs in the other end outlet of each of said lift valves; conduit means connecting one end outlet of each of said tilt valves with one end of said tilt cylinder; conduit means connecting the other end outlet of each of said tilt valves with the other end of said tilt cylinder.

References Cited in the file of this patent

UNITED STATES PATENTS

| | | |
|---|---|---|
| 1,761,726 | Havens | June 3, 1930 |
| 2,391,224 | Carter | Dec. 18, 1945 |
| 2,450,152 | Miller | Sept. 28, 1948 |
| 2,512,150 | Geren | June 20, 1950 |
| 2,531,001 | Short | Nov. 21, 1950 |
| 2,606,078 | Brock | Aug. 5, 1952 |
| 2,672,377 | Werner et al. | Mar. 16, 1954 |
| 2,674,500 | Hukari | Apr. 6, 1954 |